US007503478B2

(12) United States Patent
Jeffery

(10) Patent No.: US 7,503,478 B2
(45) **Date of Patent: *Mar. 17, 2009**

(54) LIGHT FIXTURE MANAGEMENT SYSTEM

(76) Inventor: R. Clark Jeffery, 180 Station Street, Unit 3, Ajax, Ontario (CA) L1S 1R9

( * ) Notice: Subject to any disclaimer, the term of this patent is extended or adjusted under 35 U.S.C. 154(b) by 0 days.

This patent is subject to a terminal disclaimer.

(21) Appl. No.: 11/848,774

(22) Filed: Aug. 31, 2007

(65) Prior Publication Data

US 2008/0074253 A1 Mar. 27, 2008

Related U.S. Application Data

(63) Continuation-in-part of application No. 10/812,951, filed on Mar. 31, 2004, now Pat. No. 7,284,689, which is a continuation of application No. 09/562,852, filed on May 1, 2000, now abandoned.

(51) Int. Cl.
*G06F 17/00* (2006.01)

(52) U.S. Cl. ...................................... 235/375; 235/487

(58) Field of Classification Search ................. 235/375, 235/385, 462.01, 470, 487; 702/182; 340/572.1
See application file for complete search history.

(56) References Cited

U.S. PATENT DOCUMENTS 4,550,246 A * 10/1985 Markman .................. 235/385
5,120,942 A * 6/1992 Holland et al. .............. 235/376
5,471,042 A * 11/1995 Kirkeby et al. ......... 235/472.02
5,519,878 A * 5/1996 Dolin, Jr. .................... 709/220
5,602,377 A * 2/1997 Beller et al. ........... 235/462.15
5,610,596 A * 3/1997 Petitclerc ............... 340/825.23
5,635,693 A * 6/1997 Benson et al. ........... 340/10.33

(Continued)

FOREIGN PATENT DOCUMENTS

CA 1261470 * 9/1989

(Continued)

*Primary Examiner*—Kumiko C Koyama
(74) *Attorney, Agent, or Firm*—Dimock Stratton LLP; Jenna L. Wilson

(57) ABSTRACT

A light fixture management system and method is provided for tracking one or more of the location, history and operating characteristics of light fixtures in a structure or a group of structures and surrounding premises. Each fixture is assigned indicia such as an identifier transmitted by a RFID transponder, information regarding which is stored in a database in association with fixture details. Fixtures requiring repair or maintenance are identified and the identifier is received by a portable reader. A user may optionally enter into the reader any observable problem. Received and entered information is downloaded into a computer, which generates a repair route for identified fixtures based on their locations and identified problems. Reports may be generated with other desired information such as the location of the circuit breaker associated with each fixture. The task of tracking light fixtures is thus simplified and efficiency and effectiveness of repair personnel increased.

20 Claims, 2 Drawing Sheets

U.S. PATENT DOCUMENTS

| | | | | | |
|---|---|---|---|---|---|
| 5,664,113 | A * | 9/1997 | Worger et al. | 705/28 |
| 5,724,261 | A * | 3/1998 | Denny et al. | 702/184 |
| 5,794,213 | A * | 8/1998 | Markman | 705/23 |
| 5,803,906 | A * | 9/1998 | Pratt et al. | 600/300 |
| 5,856,931 | A * | 1/1999 | McCasland | 702/182 |
| 6,031,621 | A * | 2/2000 | Binder | 358/1.1 |
| 6,480,699 | B1 * | 11/2002 | Lovoi | 455/41.2 |
| 6,731,079 | B2 * | 5/2004 | Andersen | 315/312 |
| 2006/0071790 | A1 * | 4/2006 | Duron et al. | 340/572.1 |
| 2007/0013516 | A1 * | 1/2007 | Freitag et al. | 340/572.1 |

FOREIGN PATENT DOCUMENTS

| | | | |
|---|---|---|---|
| CA | 2027639 | * | 7/1995 |
| JP | 10164627 A | * | 6/1998 |

* cited by examiner

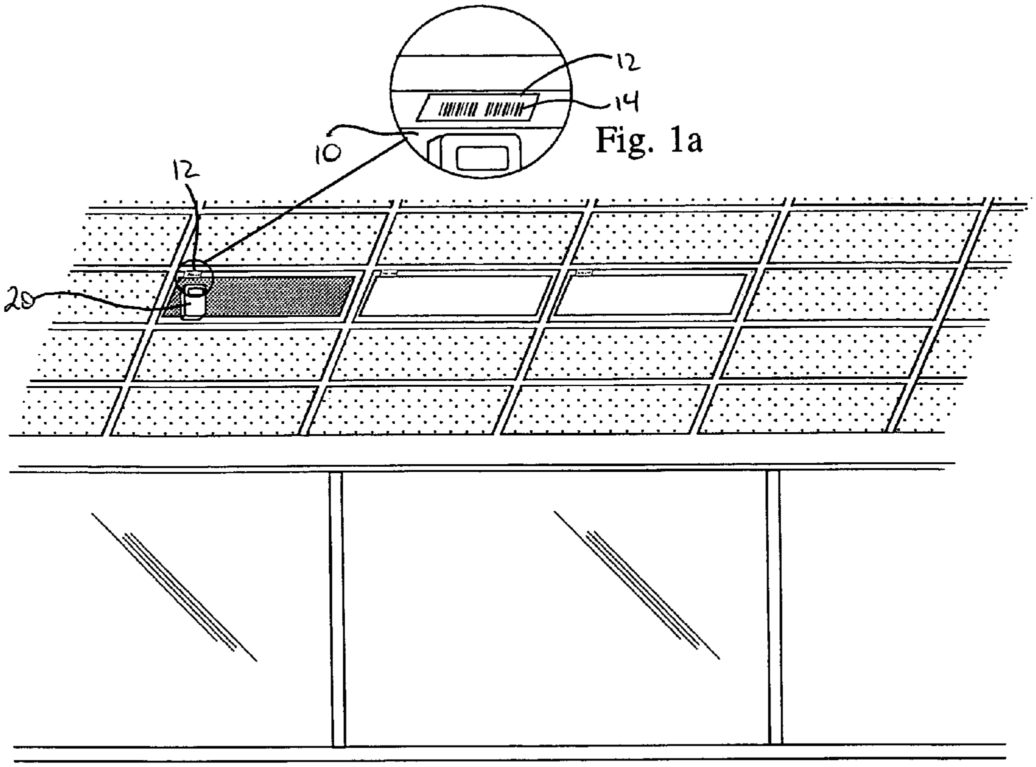
Fig. 1a
Fig. 1
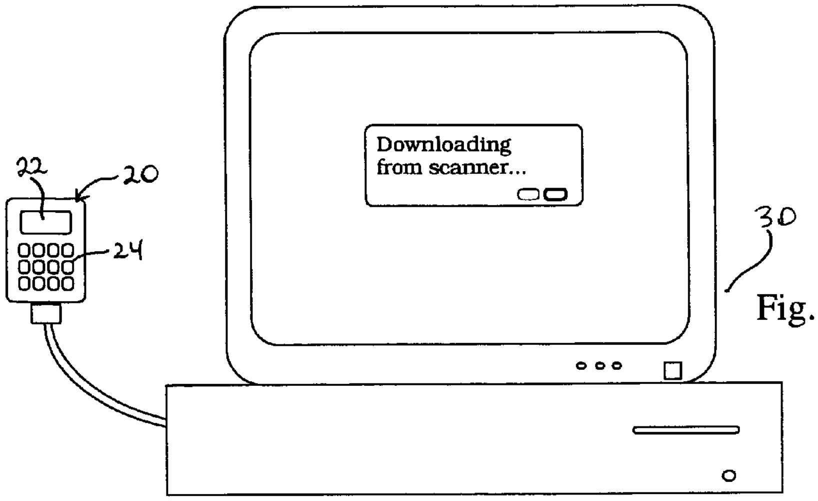
Fig. 2

Lighting Activity Report
Sorted by Group

| Code Number | Date (DD/MM/YYYY) | Floor Number | Group Number | Number of Lamps | Number of Ballasts | Work Order Number | LAMP Group Percent Annual Failure Rate |
|---|---|---|---|---|---|---|---|
| abc1234567896 | 02/08/00 | 68 | 1 | 2 | | 4421 | |
| abc1234567899 | 03/08/00 | 68 | 1 | | 1 | 3321 | |
| abc1234567916 | 03/08/00 | 66 | 1 | 2 | | 3321 | |
| abc1234567917 | 04/08/00 | 66 | 1 | 2 | | 7765 | |
| abc1234567934 | 08/08/00 | 65 | 1 | 2 | | 6654 | |
| abc1234567935 | 26/07/00 | 63 | 1 | 2 | | 6648 | |
| abc1234567952 | 01/08/00 | 63 | 1 | 2 | | 8843 | |
| abc1234567953 | 12/07/00 | 63 | 1 | | 1 | 2299 | 40.00% |
| abc1234567897 | 03/08/00 | 47 | 2 | 2 | | 2314 | |
| abc1234567900 | 03/07/00 | 47 | 2 | 2 | | 4421 | |
| abc1234567915 | 30/08/00 | 46 | 2 | | 1 | 4432 | |
| abc1234567918 | 03/07/00 | 45 | 2 | 2 | | 7789 | |
| abc1234567933 | [illegible] | | | | | | |
| | | | | | | | 2.50% |
| [illegible]4567927 | 04/08/00 | 60 | 2 | 2 | | 6633 | |
| abc1234567942 | 26/08/00 | 59 | 8 | 2 | | 9123 | |
| abc1234567945 | 08/07/00 | 5 | 8 | | 1 | 4478 | 3.50% |
| abc1234567890 | 23/08/00 | 54 | 9 | 2 | | 1122 | |
| abc1234567907 | 01/08/00 | 54 | 9 | 2 | | 6666 | |
| abc1234567908 | 30/09/00 | 53 | 9 | 2 | | 5543 | |
| abc1234567925 | 21/07/00 | 53 | 9 | 2 | | 8855 | |
| abc1234567926 | 05/08/00 | 7 | 9 | 2 | | 8844 | |
| abc1234567943 | 22/08/00 | 6 | 9 | 2 | | 9988 | |
| abc1234567944 | 21/08/00 | 6 | 9 | 2 | | 7769 | 1.20% |
| TOTAL | | | | 104 | 13 | | |

TOTAL ANNUAL FAILURE RATE: LAMPS 3.47%
Total System: 3,000
BALLASTS 0.87%
Total System: 1,500

Fig. 3

LIGHT FIXTURE MANAGEMENT SYSTEM

CROSS-REFERENCE TO RELATED APPLICATIONS

This application is a continuation-in-part of U.S. application Ser. No. 10/812,951, filed Mar. 31, 2004, now U.S. Pat. No. 7,284,689, issued Oct. 23, 2007, which is a continuation of U.S. application Ser. No. 09/562,852, filed May 1, 2000, now abandoned.

FIELD OF THE INVENTION

The present invention relates to lighting. In particular, the invention relates to a light fixture management system which facilitates the tracking repair of light fixtures in a building, complex or group of structures.

TECHNICAL BACKGROUND

Industrial and commercial buildings and multi-site complexes may have tens g, maintenance and of thousands of light fixtures of many different types, which require periodic maintenance and repair. Similarly, the maintenance and repair of light fixtures in a group of structures spread over a wide geographic area, for example a retail chain operation which may include hundreds of satellite stores in different territories, may be the responsibility of a single central office.

Presently the maintenance and repair of light fixtures in these types of situations is carried out on an ad hoc basis. A tenant or other occupant of the structure identifies a fixture in need of repair within a suite, or an employee of the building manager, for example a security guard, identifies a light fixture in need of repair in a suite or common area. The property manager is notified and issues a work order, which is delivered to the maintenance department and given to repair personnel to undertake the repair.

No particular consideration is given to carrying out light fixture maintenance or repairs in an orderly fashion, tracking the maintenance histories of light fixtures to identify latent problems or defects, or difficulties that repair personnel may encounter in effecting a repair such as problems identifying the circuit supplying power to a particular light fixture so that it can be deactivated to effect a repair. At best this results in an inefficient use of labour, and potentially parts inventory shortages. In other cases the property manager may end up paying the cost of repairing fixtures or components that are still under warranty, or may pay undue costs to maintain a defective fixture because the defect is not apparent without an overview of the repair history of the fixture.

The repair and maintenance of light fixtures in large commercial structures and complexes is thus presently a substantially random process. This leads to a number of disadvantages, including an inefficient use of repair personnel, haphazard replacement parts inventory management, inability to identify problematic fixtures and components, and attendant unnecessary costs associated with all of these. In a building or complex with thousands of light fixtures, these extra costs can be substantial.

Inventory control systems which utilize scanners such as bar code readers to record and track inventory are known in the prior art. For example, U.S. Pat. No. 5,664,113 issued Sep. 2, 1997 to Worger et al. describes a working asset management system and method for tracking a working asset; Canadian Patent No. 1,261,470 issued Sep. 26, 1989 to Markman describes a system and method for the control of dry cleaning articles; and Canadian Patent No. 2,027,639 issued Jul. 4, 1995 to Inui et al. teaches a parts supply inventory management system. U.S. Pat. No. 5,803,906 issued Sep. 8, 1998 to Pratt et al., which is incorporated herein by reference, teaches a method and system for tracking animal health histories and related information. In this system, animals such as cattle are tagged with a code related to records containing defining characteristics and a health history of each particular animal. A bar code scanner is used to scan the tag, which communicates the identity of the animal to a computer, to facilitate the retrieval of information regarding the health history of the animal.

However, all these systems involve mobile inventory. Optical scanners are used to identify items in the inventory, which can be matched with records for tracking purposes. But the inventory itself is movable, and the orderly management of the inventory is dependent upon this mobility.

Light fixtures present a peculiar problem, because they are immovable. Thus, an orderly management of light fixtures must take into account their fixed locations. Further, the wide variety of fixtures which may be maintained in any particular structure or complex raises parts inventory control problems, both in terms of stocking an adequate supply of parts and in terms of ensuring that the specific parts and components required for specific light fixtures in need of maintenance or repair are on hand. Additionally, efficient management of the light fixtures requires that the arrangement of electrical circuits controlling the various light fixtures be taken into account.

BRIEF DESCRIPTION OF THE DRAWINGS

In drawings which illustrate by way of example only a preferred embodiment of the invention, FIG. 1 is a perspective view of a light fixture being scanned by a reader, FIG. 1*a* is an enlarged perspective view of the label in FIG. 1, FIG. 2 is a schematic representation of information being downloaded from the reader to a computer, and FIG. 3 is an example of an embodiment of a lighting activity report generated according to the invention.

DETAILED DESCRIPTION OF THE INVENTION

The present invention provides a light fixture management system and method which tracks the location, history and operating characteristics of light fixtures in large industrial and commercial structures and multi-site complexes, including retail malls and shopping centers, or in a group of structures spread over a wide geographic area such as a retail chain operation. In the preferred embodiment every light fixture within and on the structures and the surrounding premises is assigned indicia, for example a bar code, or an identifier transmittable by a radio-frequency identification ("RFID") transponder which is stored in a database in association with details regarding the date of installation, fixture type, bulb type, ballust type, warranty expiry date, prior repair history, electrical circuit and any other pertinent information.

According to the invention an observer charged with identifying light fixtures in need of repair, which may for example be a building electrician or caretaker, or a security guard or night watchman who normally makes rounds through the structure or complex for security purposes, carries a portable scanner or reader, preferably with a keypad allowing additional information to be entered manually. When a light fixture in need of repair is observed, using the reader the observer reads the identifier or indicia associated with the light fixture, which may be adhered to an inconspicuous spot on or near the fixture or otherwise somehow physically associated with the fixture, for example embedded in or inserted into the fixture itself.

In the preferred embodiment the observer also enters into the reader any observable information regarding the repair problem, to the extent that the problem can be identified. At the end of the observer's rounds, the input information is downloaded into a computer, for example a personal computer (PC). The computer may be programmed to establish a repair route for fixtures identified as being in need of repair, based on the locations of the light fixtures and types of problems identified by the observer. The repair route can form part of a maintenance report which may also indicate what type bulb or other component is required for the specific light fixture requiring maintenance or repair, whether the fixture is still under warranty, whether the fixture has a history of problems, and any other desired information.

The system and method accordingly considerably simplify the task of tracking light fixtures in a structure or group of structures and their surrounding premises, and substantially increase the efficiency and effectiveness of repair personnel. By allowing maintenance personnel to generate a repair route which minimizes travel time, a much greater number of repairs can be effected using the system of the invention as opposed to the conventional, ad hoc repair scheduling presently used in and around such structures and complexes.

In a preferred embodiment, the master database contains a maintenance repair history of each light fixture, which helps to identify problematic fixtures, and identifies the location of the circuit breaker which controls power to the fixture, to enable repair personnel to quickly locate and deactivate the circuit if necessary for a particular type of repair. The latter advantage can be particularly useful in the case of emergency lighting, which is often wired to a circuit breaker on a different floor in a multi-unit structure.

With this inventory and repair information stored in the master database, reports can be generated periodically in any desired format, for tracking expenses, tenant billing, repair effectiveness and efficiency, component quality and so on.

FIG. 1 illustrates the information collection component of the system using the example of an existing light fixture 10 in a commercial building, which may be any type of light fixture 10. A signal-transmitting device 12, optionally containing unique indicia that is optically readable such as a conventional bar code 14, is associated with the light fixture 10 by being fixed on or in the vicinity of the light fixture 10. In the embodiment shown the signal-transmitting device 12 is affixed to the frame of the light fixture 10, however it will be appreciated that the precise location of the signal-transmitting device 12 relative to the light fixture 10 is a matter of selection and convenience.

For example, in a preferred embodiment, the signal-transmitting device 12 is configured to transmit a radiofrequency signal in response to a detected query, e.g., another radiofrequency signal, from a reader device. One example of such a device 12 is an RFID transponder, which may also be referred to or be commonly known as an RFID "tag". The selection and configuration of an RFID transponder, which may be passive (requiring no internal power source), or active or semi-passive (requiring a power source such as a battery) such that signals transmitted by such transponders associated with neighbouring light fixtures 10 are distinguishable by a reader will be readily appreciated by those skilled in the art. It will further be appreciated by those skilled in the art that an RFID transponder or other signal-transmitting device 12 may be adhered to an external or internal portion of the light fixture 10. Preferably the signal-transmitting device 12, if it is provided with optically readable indicia 14, is accessible to an observer without disassembling the light fixture 10. It will be understood by those skilled in the art that if an active transponder or other signal-transmitting device 12 is selected, a separate power source, such as a battery, may be provided for the device 12, or alternatively the fixture 10 and the signal-transmitting device 12 may be configured such that the device 12 is powered by the same source as the light fixture 10.

Regardless of the type of signal-transmitting device 12, the device 12 is preferably configured to transmit a radiofrequency signal comprising a unique indicia, which as described above may also be displayed in an optically readable format on the device 12. For the purpose of the embodiments described herein, "unique" refers to sufficient uniqueness such that the indicia is capable of distinguishing one light fixture among the plurality of light fixtures found within the structure or group of structures and their surrounding premises, within which the light fixture management system is implemented. For example, if the system described herein is implemented in a complex comprising at least two buildings, one light fixture installed in each of the buildings may be provided with the same indicia, provided the system was capable of distinguishing between an indicia-bearing signal received in a first building from an indicia-bearing signal received in a second building. Such distinction may be determined, for example, from the frequency of the radiofrequency signal transmitted by each signal-transmitting device 12. It will be appreciated that in cases where the characteristics of the signal transmitted by the device 12, together with the information encoded within the signal, provide a unique identifier for a given light fixture, that the unique identifier or indicia may be considered to comprise both those characteristics of, and the information encoded in, the signal.

A plurality of light fixtures 10 in and around the building or complex and its surrounding premises are labelled as described above. A portable reader 20 is provided for receiving signals transmitted by the signal-transmitting devices 12, which, as described above, may be received in response to a query signal transmitted by the reader 20 and detected by the device 12; the query signal may be transmitted by the reader 20 in response to a user command. The reader 20 extracts or reads the unique identifier from the received signal and stores this information in memory. In other embodiments the reader 20 may comprise any other suitable device, for example a barcode reader, a magnetic scanner capable of reading a magnetic bar code, strip or other indicia unique to the light fixture 10.

In the preferred embodiment the reader 20 comprises a display 22 and a keypad 24 or other user input means such as a touch screen, scroll wheel or trackball (not shown), allowing the observer to enter information into the reader 20 relating to the current scanned light fixture 10. For example, the observer may enter "BULB OUT" via a keypad 24 or touch screen to indicate a burned out light tube, or short alphanumeric codes may be assigned to various repair tasks to minimize the amount of data manually entered into the reader 20. In alternative embodiments the observer may select options presented via the display 22 using the touch screen, scroll wheel or trackball or in still further embodiments no other user input means is provided, in which case the reading operation merely identifies light fixtures 10 in need of repair. This information is stored in memory in the reader 20.

FIG. 2 illustrates the processing component of the system of the invention. A microprocessor appliance such as a personal computer (PC) 30 comprises a database for receiving information collected by the reader 20. The database preferably provides fields for many different types of information relating to the light fixtures 10, including but not limited to date of installation, fixture type, bulb type, ballust type, warranty expiry date, prior repair dates, electrical repair room in which the controlling circuit breaker is located, electrical panel and electrical circuit, and so on. In the database the information relating to each particular light fixture 10 is contained in a record referenced by the unique identifier associated with the respective light fixture 10 by virtue of the associated signal-transmitting device 12.

With this information the computer 30 can generate a report 32 setting out information specific to light fixtures 10 associated with the unique identifiers read by the reader 20. Reports 32 may be custom tailored to the requirements of the property manager or other user, setting out only such information as is required for the purpose of the report. For example, an expense report 32 may be generated for common areas with warranty information and repair history, whereas a tenant expense report might also include information regarding the location of the fixture 10. The amount and types of information which can be included in a report 32 is limited only by the types of information stored in the database, and the frequency with which such reports are generated is in the discretion of the user.

In the preferred embodiment the computer 30 is programmed to establish a repair task route for fixtures 10 identified by a user as being in need of repair, which is set out in a maintenance report 32 in the nature of a work order. This repair task route is based on the locations of the light fixtures 10 corresponding to the unique identifiers received by the reader 20 during an observation run. For example, FIG. 3 illustrates a representative Lighting Activity Report in which the previously downloaded fixtures 10 in need of repair are sorted by group, each group corresponding to a specific location in the structure or surrounding premises.

The types of problems identified by the observer which have been manually entered into the reader 20 can be identified in the maintenance report 32, along with specific information regarding the type of bulb or other component required to effect the repair. This allows repair personnel to ensure that the specific components required for the light fixtures 10 identified in the maintenance report 32 are on hand when needed.

Even where a problem has not been identified or entered by the user during observation in respect of a fixture 10 otherwise identified as being in need of repair or maintenance, the 'fixture type' information in the database can serve as a reference for the type of component which might be required to repair that particular identified fixture 10. This saves time by ensuring that repair personnel are properly equipped to maintain and repair all identified fixtures 10, and avoids wasted time returning to a storeroom to retrieve inventory and the stocking of unnecessary components.

The repair task route can alternatively be generated manually based on a list of the fixtures 10 identified in the reading operation. Whether manually- or computer-generated, the most efficient route for repairing the plurality of light fixtures 10 identified in the scan operation can be created from the information stored in the database. Moreover, any special requirements for particular fixtures 10 may be appended to the information for each light fixture 10 in the database. For example, an extension ladder which might be required to reach an otherwise inaccessible fixture 10, can be brought along by repair personnel based on an appropriate annotation in the maintenance report 32.

In operation, an observer charged with identifying light fixtures 10 in need of repair, for example a security guard or night watchman, carries the reader 20 on his or her normal rounds. When a light fixture 10 in need of repair or maintenance is observed, the observer uses the reader 20 to obtain the unique identifier associated with the observed light fixture 10 from the signal-transmitting device 12. In those embodiments where the signal-transmitting device 12 is also provided with an optically readable indicia comprising the unique identifier and the reader 20 is further equipped with a scanner for reading such indicia, the observer may alternatively obtain the unique identifier using that function of the reader 20. Preferably, the observer also enters into the reader 20 any observable information regarding the repair or maintenance activity required, and this information is stored in association with the unique identifier thus read.

When this information collection operation is complete, the reader information is downloaded into the computer 30, which adds the input information to the database record for each respective scanned light fixture 10 by associating the unique identifiers received by the reader 20 with the corresponding unique identifiers stored in the database.

The computer 30 may then generate a maintenance report with an optimized repair task route, setting out the supplies that will be required, any special or unusual circumstances relating to specific fixtures 10, and the location of the circuit breaker which controls power to each fixture 10. The latter information allows repair personnel to quickly locate and deactivate the correct circuit if necessary for a particular type of repair, which can be particularly useful in the case of emergency lighting or other secondary light fixtures which may be fed by a circuit controlled by a circuit breaker on a different floor or in a different part of the structure or premises.

With the inventory and repair information stored in the database on an ongoing basis, reports 32 can be generated with any desired frequency and in any desired format, for tracking expenses, billing, repair effectiveness and efficiency, fixture and component quality, and for any other purpose.

The system and method of the invention can be applied over a wide geographic area, for example in a retail application in which an enterprise maintains a head office and a number of satellite stores, which may for example be warehouse-type outlets that have significant lighting requirements. Frequently such retail operations contract lighting maintenance to a lighting service company, which services light fixtures 10 on an "on-call" basis or a stipulated timetable periodic inspection basis, or some combination of the two. In the prior art, the lighting service company would simply repair and maintain lighting fixtures 10 in an ad hoc fashion, using floor layouts and reflected ceiling plans for the various outlets.

By contrast, in accordance with the preferred embodiments described herein, lighting information collected at the individual retail outlets may be downloaded by the retail outlets to a host server at the head office (or other designated location), since this communication link typically already exists in modern retail businesses, and the information can thus be maintained in a master database. Thus, lighting information for an entire chain of outlets can be accessed from the central server on a real-time basis, facilitating both maintenance and analysis of lighting fixtures 10 as described above and substantially reducing the number of maintenance calls required from the lighting service company.

Preferred embodiments of the invention having been thus described by way of example, variations and modifications will be apparent to those skilled in the art. The invention includes all such variations and modifications as fall within the scope of the appended claims.

I claim:

1. A light fixture management system, comprising:

a plurality of signal-transmitting devices, each configured to transmit a unique identifier;

a portable reader for receiving signals comprising the unique identifiers transmitted by the signal-transmitting devices;

a microprocessor appliance comprising a database, for receiving information from the portable reader comprising the identifiers received by the reader, and associating the received information with corresponding information in the database, wherein the database comprises information relating to the locations of each of a plurality of light fixtures and supplies relating to each of the plurality of light fixtures, wherein when each of the plurality of signal-transmitting devices is physically associated with a corresponding one of the plurality of light fixtures and the information received by the microprocessor appliance comprises the unique identifiers received by the portable reader from signal-transmitting devices associated with those light fixtures identified as being in need of repair or maintenance, the microprocessor appliance is configured to generate a report with information specific to light fixtures thus identified, the report comprising a repair task route based on relative locations of the identified light fixtures, specifying a sequence of light fixture maintenance based on the relative locations of the identified light fixtures and identifying supplies required for the identified light fixtures.

2. The light fixture management system of claim 1 wherein the plurality of signal-transmitting devices is a plurality of radio-frequency identification transponders.

3. The light fixture management system of claim 2 wherein the plurality of radio-frequency identification transponders is selected from one or more of: passive, active, and semi-passive radio-frequency identification transponders.

4. The light fixture management system of claim 2 wherein each of the plurality of radio-frequency identification transponders is configured to be physically associated with one of the plurality of light fixtures by adhesion to the light fixture.

5. The light fixture management system of claim 2 wherein the report further comprises at least one of:

information relating to special requirements relating to specific ones of the identified light fixtures; and information relating to a circuit breaker controlling power to each identified light fixture.

6. The light fixture management system of claim 2 wherein the portable reader comprises a keypad for manually entering information into the scanner.

7. The light fixture management system of claim 1 wherein the light fixtures identified as being in need of repair or maintenance are identified by an observer operating the portable reader.

8. The light fixture management system of claim 1 in which the information in the database further comprises at least one of:

repair history information for each light fixture; and warranty information for each light fixture.

9. The light fixture management system of claim 1, wherein the supplies relating to the plurality of light fixtures comprised in the database include at least one of a fixture type and a bulb type for each of the plurality of light fixtures, and the supplies identified in the report generated by the microprocessor appliance include at least one of a fixture type and a bulb type for each of the identified light fixtures.

10. A method of managing a plurality of light fixtures, each light fixture being physically associated with a corresponding one of a plurality of signal-transmitting devices, each signal-transmitting device being configured to transmit a unique identifier, comprising the acts of:

receiving signals comprising the unique identifiers transmitted by signal-transmitting devices physically associated with light fixtures identified as being in need of repair or maintenance, and storing information corresponding to the unique identifiers;

conveying the stored information corresponding to the unique identifiers to a microprocessor appliance comprising a database, wherein the database comprises information relating to the plurality of light fixtures comprising the locations of the plurality of light fixtures and supplies relating to the plurality of light fixtures, and generating a report using the microprocessor appliance with information specific to the light fixtures thus identified, the report comprising a repair task route based on relative locations of the identified light fixtures and specifying a sequence of fixture maintenance based on the relative locations of the identified light fixtures, and further identifying supplies required for the identified light fixtures.

11. The method of claim 10 wherein the plurality of signal-transmitting devices is a plurality of radio-frequency identification transponders.

12. The method of claim 11 wherein the plurality of radio-frequency identification transponders is selected from one or more of: passive, active, and semi-passive radio-frequency identification transponders.

13. The method of claim 11 further comprising the act of physically associating each of the plurality of radio-frequency identification transponders with a corresponding one of the plurality of light fixtures by adhering each of said radio-frequency identification transponders to the said corresponding one of the plurality of light fixtures.

14. The method of claim 10 wherein the report further comprises information relating to special requirements relating to specific ones of the identified light fixtures.

15. The method of claim 10 in which the report contains information relating to a circuit breaker controlling power to each identified light fixture.

16. The method of claim 10 further comprising the act of storing user-entered information corresponding to the identified light fixtures in association with the unique identifiers, and wherein the act of conveying the stored information to the microprocessor appliance comprises conveying the stored user-entered information to the microprocessor appliance.

17. The method of claim 10 wherein the light fixtures identified as being in need of repair or maintenance are identified by a user operating a reader for carrying out the act of receiving signals.

18. The method of claim 10 wherein the database further comprises at least one of:

repair history information for each one of the plurality of light fixtures; and warranty information for each one of the plurality of light fixtures.

19. The method of claim 10 wherein the supplies relating to the plurality of light fixtures comprised in the database include at least one of a fixture type and a bulb type for each of the plurality of light fixtures, and the supplies identified in the report generated using the microprocessor appliance include at least one of a fixture type and a bulb type for each of the identified light fixtures.

20. The method of claim 10 including, after the act of conveying the stored information, the act of downloading the conveyed information from the database to a master database at another geographic location.

* * * * *